United States Patent
Rajagopalan et al.

(10) Patent No.: US 6,949,617 B2
(45) Date of Patent: Sep. 27, 2005

(54) GOLF BALLS COMPRISING CHIRAL DIOLS OR CHIRAL CYCLIC ETHERS

(75) Inventors: Murali Rajagopalan, South Dartmouth, MA (US); Shenshen Wu, North Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/434,739

(22) Filed: May 9, 2003

(65) Prior Publication Data

US 2004/0225100 A1 Nov. 11, 2004

(51) Int. Cl.$^7$ .............................................. C08G 18/48
(52) U.S. Cl. ......................... 528/76; 473/378; 473/376
(58) Field of Search ............................ 528/76; 473/378, 473/376

(56) References Cited

U.S. PATENT DOCUMENTS

| | | |
|---|---|---|
| 3,358,042 A | 12/1967 | Dunlop et al. |
| 4,120,850 A | 10/1978 | Pechhold .................... 528/66 |
| 4,123,061 A | 10/1978 | Dusbiber .................... 273/220 |
| 4,590,285 A | 5/1986 | Ernst ......................... 549/509 |
| 4,960,849 A | 10/1990 | Okabe et al. ................. 528/76 |
| 5,126,170 A | 6/1992 | Zwiener et al. ............. 427/385.5 |
| 5,236,741 A | 8/1993 | Zwiener et al. ............. 427/385.5 |
| 5,484,870 A | 1/1996 | Wu ............................ 528/28 |
| 5,959,059 A | 9/1999 | Vedula et al. ................. 528/76 |
| 6,106,415 A * | 8/2000 | Masutani et al. ............ 473/374 |
| 6,371,870 B1 | 4/2002 | Calabria et al. ............. 473/370 |
| 6,518,358 B1 | 2/2003 | Wu ............................ 524/720 |
| 6,528,578 B2 | 3/2003 | Wu ............................ 524/750 |
| 6,720,459 B2 * | 4/2004 | Sunkara et al. ............. 568/619 |
| 2002/0039935 A1 * | 4/2002 | Dewanjee .................... 473/371 |
| 2003/0045378 A1 | 3/2003 | Bissonnette et al. ........ 473/378 |
| 2003/0064826 A1 | 4/2003 | Voorheis et al. ............ 473/367 |

OTHER PUBLICATIONS

M. Szycher, Handbook of Polyurethanes, 1999, p. 3–6.*

* cited by examiner

*Primary Examiner*—Rachel Gorr
(74) *Attorney, Agent, or Firm*—William B. Lacy

(57) ABSTRACT

A golf ball comprising a core and a cover, wherein the core or the cover comprises a thermoplastic or thermoset composition comprising a polyurethane prepolymer formed from a reactant A comprising an isocyanate; and a reactant B comprising a polyether polyol having a repeating branched oxyalkylene monomer unit, or a polymerized polyol formed from a chiral diol or a chiral cyclic ether.

27 Claims, No Drawings

GOLF BALLS COMPRISING CHIRAL DIOLS OR CHIRAL CYCLIC ETHERS

FIELD OF THE INVENTION

The present invention relates to golf balls, and more particularly to novel compositions for a golf ball that comprises a polymerized polyahl formed from a chiral diol or a chiral cyclic ether.

BACKGROUND OF THE INVENTION

The United States Golf Association ("USGA") provides five (5) regulations to keep golf balls consistent. Specifically, the golf ball must weigh no more than 1.62 ounces and measure no less than 1.68 inches in diameter. The initial velocity of the ball as tested on a USGA machine at a set club head speed must not exceed 255 ft/sec. The overall distance of the ball as tested with a USGA specified driver at 160 ft/sec and a 10-degree launch angle must not exceed 296.8 yards. Furthermore, the ball must pass a USGA-administered symmetry test. Within the confines of these regulations, other performance characteristics of the ball, including distance, durability, feel, spin, sound, and the like may be modified through alterations in material compositions, constructions, diameters and/or thickness, and surface configurations of various portions of the ball, such as the core, the cover, and intermediate layer(s) therebetween. Other physical, mechanical, chemical, and/or optical properties of the portions, including color stability, compression, density, flexural modulus, gas or vapor permeability, hardness, stiffness, tear resistance, weight, and the like may also be affected by these alterations.

Conventional cover or intermediate layer materials for golf balls include ionomer resins and polyurethanes. Chemically, ionomer resins are a copolymer of an olefin and an ethylenically unsaturated α,β-carboxylic acid having 10 to 100 percent of the carboxylic acid groups neutralized by a metal ion. Polyurethanes are typically formed from a prepolymer of polyol with isocyanate and a curing agent. Ionomer covers are virtually cut-proof, but they provide inferior spin and feel to the golf balls. Conventional polyurethane covers generally afford excellent feel and good durability, but not resilience or light stability comparable to ionomer covers.

Polyurea has also been proposed as cover materials for golf balls. Like polyurethanes, polyureas are not completely comparable to ionomer covers with respect to resilience. Therefore, ' there remains a continuing need for golf ball materials and compositions with superior resistance to cut, scratch, abrasion, discoloration, moisture, and other wearing and weathering elements, that provide improved performance characteristics such as resilience and feel.

SUMMARY OF THE INVENTION

The present invention is directed to a golf ball having a core and a cover, at least one of which comprises a thermoplastic or thermoset composition of a polyurethane prepolymer or polyurea prepolymer formed from a reactant A comprising an isocyanate, and a reactant B comprising polymerized polyahl (polymerized polyol or polymerized polyamine, respectively). The polymerized polyol is preferably a polymerization product of a chiral diol or chiral cyclic ether, or a polyether polyol having a repeating branched oxyalkylene monomer unit. The polymerized polyamine is preferably derived from the polyol through an amination reaction.

The polymerized polyahl may be a homopolymer of a chiral diol or chiral cyclic ether, but is preferably a random, block, or grafted copolymer formed from the chiral diol or chiral cyclic ether and a second diol or cyclic ether. The chiral diol preferably has a formula (I) of:

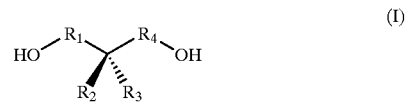

where $R_1$ and $R_4$ are different linear or branched hydrocarbon moieties having 1 to about 10 carbon atoms, $R_2$ and $R_3$ are different moieties selected from hydrogen or linear or branched hydrocarbon moieties having 1 to about 10 carbon atoms. The chiral cyclic ether preferably has a formula (II) of:

where $R_1$ and $R_4$ are different linear or branched hydrocarbon moieties having 1 to about 10 carbon atoms, $R_2$ and $R_3$ are different moieties selected from hydrogen or linear or branched hydrocarbon moieties having 1 to about 10 carbon atoms. The second diol or cyclic ether preferably has 2 to about 20 carbon atoms, and may be chiral or achiral. For example, the chiral diol may be 2-methyl-1,4-butanediol; the chiral cyclic ether may be 2-methyl-tetrahydrofuran; the second diol may be 1,4-butanediol; and the second cyclic ether may be tetrahydrofuran.

In one embodiment, the polymerized polyahl is a polyether polyahl having at least one repeating branched oxyalkylene monomer unit, preferably having a formula (III) of:

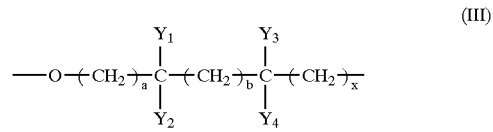

where $Y_1$ to $Y_4$ are independently hydrogen or hydrocarbon moieties and at least one of which is an alkyl moiety having 1 to about 10 carbon atoms, and a, b and x are independently zero or integers from 1 to about 10 and at least one of which is greater than zero. The polymerized polyahl may be a polyether polyol or polyether polyamine having a respective formula (IV) or (V) of:

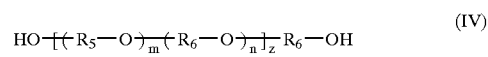

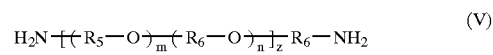

where $R_5$ is a linear or branched hydrocarbon moiety comprising 2 to about 20 carbon atoms, $R_6$ is a branched hydrocarbon moiety having 3 to about 20 carbon atoms, m and n are independently zero or integers from 1 to about 100, and z is an integer from 1 to about 100. Preferably, $R_5$ may be —$CH_2$—$CH_2$—$CH_2$—$CH_2$—, $R_6$ is —$CH_2$—$CH(CH_3)$—$CH_2$—$CH_2$— or —$CH_2$—$CH_2$—$CH(CH_3)$—$CH_2$—, m and n are independently selected from about 5 to about 50, and z is from 1 to about 50. The polymerized polyahl is more preferably a substantially non-crystalline block co-polyether polyol or polyamine having a melting point of less than about 20° C. and, as it is used in the prepolymer, having a molecular weight of about 500 to about 10,000.

The polymerized polyahl reacts with the isocyanate at an equivalent ratio of about 0.01:1 to about 1:1, preferably forming a prepolymer having a NCO content of less than about 15 percent. The isocyanate may be organic, modified organic, aliphatic, alicyclic, unsaturated, araliphatic, aromatic, substituted, or unsubstituted, comprising isocyanate-containing monomers, dimers, trimers, multimeric adducts, oligomers, polymers, prepolymers, low-free-monomer prepolymers, quasi-prepolymers, diisocyanates, polyisocyanates, uretdiones, isocyanurates, or blends thereof. The prepolymer is then reacted with a curing agent at an equivalent ratio of about 1:0.6 to about 1:1.5. The curing agent includes saturated or unsaturated monomeric polyahls, oligomeric polyahls, polyether polyahls, polyester polyahls, polycaprolactone polyahls, polycarbonate polyahls, polyhydrocarbon polyahls, polyamide polyahls, polyolefin polyahls, polyahls converted from acid functional oligomers or polymers or ionomers thereof, diols, triols, tetraols, polyols, diamines, triamines, tetramines, polyamines, amine- and hydroxy-containing hybrid compounds, epoxies, and combinations thereof. Preferably, the composition is substantially saturated. More preferably, all the components forming the composition are substantially saturated.

Alternatively, the polyether polyahls or polymerized polyahls of the present invention, particularly those having a molecular weight of about 200 to about 5,000, may be use as a curing agent to cure any polyurethane or polyurea prepolymers, including those disclosed herein, at a prepolymer-to-curative equivalent ratio of about 1:0.6 to about 1:1.5. They may be used alone or in combination or in combination with one or more of the curing agents disclosed herein, Preferably, the composition is substantially saturated. More preferably, all the components forming the composition are substantially saturated.

The polyurethane or polyurea composition of the present invention comprising the polyether polyahl or the polymerized polyahl preferably has a material hardness of less than about 90 Shore D, more preferably less than about 70 Shore D. The resulting golf ball preferably has a compression of less than about 100. Preferably, at least one of the golf ball cover layers, such as an inner cover layer or an outer cover layer, is formed from a thermoplastic or thermoset polyurethane or polyurea composition, and has a Shore D hardness of about 30 to about 70 and a flexural modulus of about 10,000 psi to about 80,000 psi. The golf ball may further include one or more intermediate layers between the core and the cover. At least one of these intermediate layers is preferably formed from a thermoplastic material, such as Ionomers, elastomers, or acid copolymers or terpolymers having an acid content of about 2% to about 50% and being neutralized by 1 to about 100% or more.

The most preferred polymerized polyahls of the present invention are poly(tetrahydrofuran-co-methyltetrahydrofuran) terminated with hydroxy groups and/or amine groups, having a preferred molecular weight of about 1,000 to about 5,000. These co-polyether polyahls may be used in the core, the intermediate layer, and/or the cover of a golf ball.

DEFINITIONS

As used herein, the term "polyahl" or "reactive polyahl" refers to any one compound or a mixture of compounds containing a plurality of active hydrogen moieties per molecule. Illustrative of such active hydrogen moieties are —OH (hydroxy group), —SH (thio group), —COOH (carboxylic acid group), and —NHR (amine group), with R being hydrogen, alkyl, aryl, or epoxy; all of which may be primary or secondary. These active hydrogen moieties are reactive to free isocyanate groups, forming urethane, urea, thiourea or corresponding linkage depending on the particular active hydrogen moiety being reacted. The polyahls may be monomers, homo-oligomers, co-oligomers, homopolymers, or copolymers. Oligomeric and polymeric polyahls having at least one NCO-reactive group on each terminal of a backbone are typically employed as the soft segment in reaction products such as polyureas and polyurethanes. Depending on the terminal groups, the oligomeric and polymeric polyahls may be identified as polyols (with —OH terminals only), polyamines (with —NHR terminals only), or amino alcohol oligomers or polymers (with both —OH and —NHR terminals). Such polyahls with a relatively low molecular weight (less than about 5,000), and a wide variety of monomeric polyahls, are commonly used as curing agents. The polyahls are generally liquids or solids meltable at relatively low temperatures.

As used herein the term "chiral" is used on materials having a molecular structure that is not superimposible on its mirror image. Some chiral molecules have one or more chiral centers, in which an atom such as carbon is bonded to four different moieties. Other chiral molecules may not have any such chiral centers. Any one chiral molecule disclosed herein includes all of its stereoisomers and optical isomers, such as (R) and (S) enantiomers and diastereomers, and mixture thereof, such as racemic mixtures (i.e., exact 50:50 mixtures of opposite enantiomers).

As used herein, the term "saturated" or "substantially saturated" means that the compound or material of interest is fully saturated (i.e., contains no double bonds, triple bonds, or aromatic ring structures), or that the extent of unsaturation is negligible, e.g. as shown by a bromine number in accordance with ASTM E234-98 of less than 10, preferably less than 5.

As used herein, the term "percent NCO" or "% NCO" refers to the percent by weight of free, reactive, and unreacted isocyanate functional groups in an isocyanate-functional molecule or material. The total formula weight of all the NCO groups in the molecule or material, divided by its total molecular weight, and multiplied by 100, equals the percent NCO.

As used herein, the term "equivalent" is defined as the number of moles of a functional group in a given quantity of material, and calculated from material weight divided by equivalent weight, the later of which refers to molecular weight per functional group. For isocyanates the equivalent weight is (4210 grams)/% NCO; and for polyols, (56100 grams)/OH#.

As used herein, the term "flexural modulus" or "modulus" refers to the ratio of stress to strain within the elastic limit (measured in flexural mode) of a material, indicates the bending stiffness of the material, and is similar to tensile modulus. Flexural modulus, typically reported in Pascal ("Pa") or pounds per square inches ("psi"), is derived in accordance to ASTM D6272-02.

As used herein, the term "water vapor transmission rate" ("WVTR") refers to the mass of water vapor that diffuses into a material of a given thickness per unit area per unit time at a specific temperature and humidity differential. Standard tests for WVTR include ASTM E96-00.

As used herein, the term "material hardness" refers to indentation hardness of non-metallic materials in the form of a flat slab or button as measured with a durometer. The durometer has a spring-loaded indentor that applies an indentation load to the slab, thus sensing its hardness. The material hardness can indirectly reflect upon other material properties, such as tensile modulus, resilience, plasticity, compression resistance, and elasticity. Standard tests for material hardness include ASTM D2240-02b. Unless otherwise specified, material hardness reported herein is in Shore D. Material hardness is distinct from the hardness of a golf ball portion as measured directly on the golf ball (or other spherical surface). The difference in value is primarily due to the construction, size, thickness, and material composition of the golf ball components (i.e., center, core and/or layers) that underlie the portion of interest. One of ordinary skill in the art would understand that the material hardness and the hardness as measured on the ball are not correlated or convertible.

As used therein, the term "compression," also known as "ATTI compression" or "PGA compression," refers to points derived from a Compression Tester (ATTI Engineering Company, Union City, N.J.), a scale well known in the art for determining relative compression of a spherical object. Compression is a property of a material as measured on a golf ball construction (i.e., on-ball property), not a property of the material per se.

As used herein, the term "coefficient of restitution" or "COR" for golf balls is defined as the ratio of a ball's rebound velocity to its initial incoming velocity when the ball is fired out of an air cannon into a rigid vertical plate. The faster a golf ball rebounds, the higher the COR it has, the more the total energy it retains when struck with a club, and the longer the ball flies. The initial velocity is about 50 ft/s to about 200 ft/s, and is usually understood to be 125 ft/s, unless otherwise specified. A golf ball may have different COR values at different initial velocities.

The term "about," as used herein in connection with one or more numbers or numerical ranges, should be understood to refer to all such numbers, including all numbers in a range.

DETAILED DESCRIPTION OF THE INVENTION

The cover of the golf ball provides the interface between the ball and a club. Desirable properties for the cover include good moldability, high abrasion resistance, high tear strength, and high resilience. The cover generally should provide sufficient strength for good performance characteristics and durability. The cover may have a single-layer construction, or a multi-layer construction that includes one or more inner cover layers and an outer cover layer. The material compositions described herein, while applicable in any portion of the golf ball, are preferably used to form cover layer(s), including single-layer covers, inner cover layers, and/or outer cover layers.

The cover layer, particularly the outer cover layer, of the present invention may comprise about 1 weight percent to about 100 weight percent, preferably about 5 weight percent to about 95 weight percent, of a thermoplastic or thermoset composition. The composition, preferably formed from a castable liquid reactive material, comprises a polymerization product of a chiral diol or chiral cyclic ether, or a polyether polyahl (polyol or polyamine) having a repeating branched oxyalkylene monomer unit. In one embodiment, the composition comprises a polyurethane prepolymer of an isocyanate and a polyol. The polyol is preferably the polymerization product having hydroxy terminals, or the polyether polyol. The polyurethane prepolymer is typically cured with a curing agent to form a polyurethane composition suitable for golf ball cover applications.

The chiral diol suitable to form the polyol preferably has a formula (I) of:

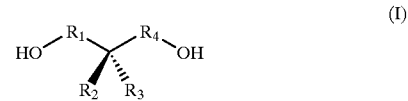

where $R_1$ and $R_4$ are different linear or branched hydrocarbon, preferably alkylene, moieties having 1 to about 10 carbon atoms, $R_2$ and $R_3$ are different moieties selected from hydrogen or linear or branched hydrocarbon, preferably alkyl, moieties having 1 to about 10 carbon atoms. More preferably, $R_1$ and $R_4$ are alkylene moieties having 1 to about 6 carbon atoms, while at least one of $R_2$ and $R_3$ is an alkyl moiety having 1 to about 6 carbon atoms. The chiral cyclic ether suitable to form the polyol preferably has a formula (II) of:

where $R_1$ and $R_4$ are different linear or branched hydrocarbon, preferably alkylene, moieties having 1 to about 10 carbon atoms, $R_2$ and $R_3$ are different moieties selected from hydrogen or linear or branched hydrocarbon, preferably alkyl, moieties having 1 to about 10 carbon atoms. More preferably, $R_1$ and $R_4$ are alkylene moieties having 1 to about 6 carbon atoms, while at least one of $R_2$ and $R_3$ is an alkyl moiety having 1 to about 6 carbon atoms.

The chiral diol may self-polymerize through a condensation reaction, or co-polymerize with a second diol also via condensation, or polymerize with a second cyclic ether through a base-catalyzed ring-opening reaction. The chiral cyclic ether may self-polymerize through an acid-catalyzed ring-opening reaction, or co-polymerize with a second cyclic ether also via acid-catalyzed ring-opening, or polymerize with a second diol through base-catalyzed ring opening. The second diol or cyclic ether may be chiral or achiral, which include the chiral diol (I), the chiral cyclic ether (II), and other alkylene diols, and preferably have 2 to about 20 carbon atoms. In one embodiment, the second diol or cyclic ether has an alkylene moiety of 2 to about 12 carbon atoms, preferably 3 to about 6 carbon atoms. The resulting polyol of the polymerization reaction may be a homopolymer of the chiral diol or chiral cyclic ether, but is preferably a random, block, or grafted copolymer formed from the chiral diol or chiral cyclic ether and the second diol or cyclic ether. One of ordinary skill in the art would understand that the chiral diol (I) and the chiral cyclic ether may be converted from one to the other using conventional chemistry. Likewise, the second diol and cyclic ether may also be inter-convertible. Conversion of the diols to the cyclic ethers may be particularly desirable to enable subsequent ring-opening polymerization of the cyclic ethers. The catalytic cyclization of diols into cyclic ethers is well known to the skilled in the art. As a non-limiting illustration, the chiral diol may be 2-methyl-1,4-butanediol; the chiral cyclic ether may be 2-methyl-tetrahydrofuran; the second diol may be 1,4-butanediol (achiral); and the second cyclic ether may be tetrahydrofuran (achiral). Other chiral diols include 2,4-petanediol and 3-methyl-1,3-butanediol.

The polyol of the present invention has at least one repeating branched oxyalkylene or alkyleneoxy monomer unit, preferably a chiral oxyalkylene monomer unit, having a formula (III) of:

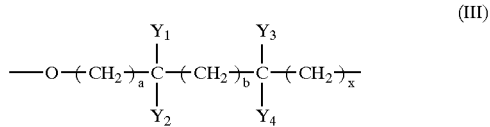

where $Y_1$ to $Y_4$ are independently hydrogen or hydrocarbon, preferably alkyl, moieties, at least one of which is an alkyl moiety having 1 to about 10 carbon atoms, and a, b, and x are independently zero or integers from 1 to about 10. Preferably, $Y_1$ to $Y_4$ all have less than about 6 carbon atoms, and a, b, and x are all less than about 6. The polyol may also have a second repeating oxyalkylene monomer unit which is branched or, preferably, linear having 2 to about 20 carbon atoms. Exemplary linear and branched oxyalkylene monomer units include, but are not limited to, —O—$CH_2$—CH($CH_3$)—$CH_2$—$CH_2$—, —O—$CH_2$—$CH_2$—CH($CH_3$)—$CH_2$—, —O—CH($CH_3$)—$CH_2$—$CH_2$—$CH_2$—, —O—$CH_2$—$CH_2$—$CH_2$—CH($CH_3$)—, —O—CH($CH_3$)—$CH_2$—$CH_2$—, —O—$CH_2$—CH($CH_3$)—$CH_2$—, —O—$CH_2$—$CH_2$—CH($CH_3$)—, —O—C($CH_3$)$_2$—$CH_2$—, —O—$CH_2$—C($CH_3$)$_2$—, —O—CH($CH_2CH_3$)—$CH_2$—, —O—$CH_2$—CH($CH_2CH_3$)—, —O—CH($CH_3$)—$CH_2$—, —O—$CH_2$—CH($CH_3$)—, —O—$CH_2$—$CH_2$—$CH_2$—, —O—$CH_2$—$CH_2$—$CH_2$—$CH_2$—, —O—$CH_2$—$CH_2$—, O—$CH_2$—, and —O—$CH_2$—$CH_2$—.

In a preferred embodiment, the polyol is a polyether polyol having a formula (IV) of:

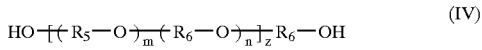

where $R_5$ is a linear or branched hydrocarbon, preferably alkylene, moiety comprising 2 to about 20 carbon atoms, $R_6$ is a branched hydrocarbon, preferably alkylene, moiety having 3 to about 20 carbon atoms, m and n are independently zero or integers from 1 to about 100, and z is an integer from 1 to about 100. $R_6$ may be essentially equivalent to the structure of $R_1$—C($R_2$)($R_3$)—$R_4$ in the formulas (I) and (II) above, or —O—$R_6$ may be essentially equivalent to the branched oxyalkylene monomer unit (III). The polyether polyol (IV) can be formed from the chiral diol (I) or chiral ether (II) and the second diol or cyclic ether at a molar ratio of about 85:15 to about 20:80. The synthesis of polyether polyols from chiral cyclic ethers and achiral cyclic ethers is disclosed in U.S. Pat. Nos. 3,358,042, 4,120,850, 4,590,285, and 4,960,849, the disclosures of which are incorporated herein by reference in their entirety.

Preferably, the polyether polyol is formed from a ring-opening co-polymerization of 2-methyl-tetrahydrofuran with tetrahydrofuran, so that $R_6$ is either , —$CH_2$—CH($CH_3$)—$CH_2$—$CH_2$— or —$CH_2$—$CH_2$—CH($CH_3$)—$CH_2$—, $R_5$ is —$CH_2$—$CH_2$—$CH_2$—$CH_2$—, m and n are independently selected from about 5 to about 50, and z is from 1 to about 50. This polyether polyol is referred to as a modified polytetramethylene ether glycol ("PTMEG"), or a hydroxy-terminated poly(tetrahydrofuran-co-methyltetrahydrofuran) ether.

The polyol as described above may be converted into a polyamine, i.e., replacing the terminal hydroxy groups with amine groups, through an amination reaction as understood by the skilled in the art. The resulting polyamine may then be reacted with an isocyanate to form a polyurea prepolymer, suitable for a polyurea composition in golf ball applications. In particular, the polyether polyol (IV) may be aminated to a polyamine having a formula (V) of:

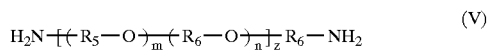

where $R_5$ is a linear or branched hydrocarbon, preferably alkylene, moiety comprising 2 to about 20 carbon atoms, $R_6$ is a branched hydrocarbon, preferably alkylene, moiety having 3 to about 20 carbon atoms, m and n are independently zero or integers from 1 to about 100, and z is an integer from 1 to about 100.

The polyahls of the present invention, including the polyols and the polyamines derived therefrom as described above, may further comprise substituted groups or moieties. Suitable substitution groups or moieties include, without limitation, fluoride, chloride, bromide, iodide, cyanide, sulfide, silicone, carboxylate, sulfonate, phosphonate, acrylate, methacrylate, epoxy, hydrocarbon, fluorocarbon, halogenated polyether, polyalkylene oxide, aromatic, or vinyl groups or moieties; urethane or urea units; terminal or pendant functional groups or moieties, such as primary or secondary hydroxyl groups, primary or secondary amine groups, isocyanate groups, (meth)acrylate groups, epoxy groups, neutralized or un-neutralized acid groups, or ethylenically unsaturated polymerizable groups. These units, groups, moieties, or combinations thereof may be present in the polyahls to provide enhanced functionality and/or reactivity.

The unique structural and compositional characteristics of the polyahls results in their physical, chemical, thermal, and other properties that are desirable and advantageous in golf ball applications. For example, these polyahls have lowered crystallinity, lowered melting points, liquid property at a widened range of temperature, improved flexibility at low temperatures, reduced energy loss in tensile mode, improved flex fatigue, improved resilience, and other enhanced elastic properties. The polyahls of the present invention preferably has at least one of material hardness, flexural modulus, elastic modulus, storage modulus, elongation, tensile strength, tear strength, and compression that fluctuates less than about 10% in a temperature range of about −20° C. to about 20° C., more preferably about −25° C. to about 50° C., and most preferably about −30° C. to about 100° C. Suitable polyahls have a molecular weight of at least about 200, a polydispersity of less than about 3, a melting point of less than about 15° C., a flash point of at least about 250° C., a viscosity of about 50 cps to about 20,000 cps at 40° C., a density of about 0.8 g/cm$^3$ to about 1.2 g/cm$^3$, a material hardness of less than about 90 Shore D, a percent rebound of at least about 40%, a hysteresis of less than about 50%, a flexural or elastic modulus of at least about 500 psi, and a water vapor transmission rate of less than about 2 g/(m$^2$× day). The molecular weight of the preferred polyahls is preferably about 500 to about 10,000, more preferably about 1,000 to about 5,000. The melting point of the preferred polyahls is preferably about 15° C., and more preferably less than about 12° C. As understood to one skilled in the art, melting point of an organic material such as the polyahls of the present invention are also referred to as freezing point. The polydispersity of the preferred polyahls is preferably less than about 2.5, and more preferably less than about 2.1. The polyahls further have a hydroxyl number or amine number of about 10 to about 300, preferably about 20 to about 150.

The polyahl of the present invention, alone or in a blend, may be reacted with an isocyanate at an equivalent ratio of about 0.01:1 to about 1:1 to form a polyurethane prepolymer or polyurea prepolymer having a NCO content of less than about 30 percent, preferably less than about 15 percent. Any isocyanate available to one of ordinary skill in the art is suitable for use according to the invention. The isocyanate may be organic, modified organic, saturated, aliphatic, alicyclic, unsaturated, araliphatic, aromatic, substituted, or unsubstituted diisocyanate or polyisocyanate monomers having two or more free reactive isocyanate ("NCO") groups; isomers thereof; modified derivatives thereof; dimers thereof; trimers thereof; or isocyanurates thereof. The isocyanate may also include any isocyanate-terminated multimeric adducts, oligomers, polymers, prepolymers, low-free-monomer prepolymers, quasi-prepolymers, and modified polyisocyanates derived from the isocyanates and polyisocyanates above. Low-free-monomer prepolymers refer to prepolymers having free isocyanate monomer levels less than about 0.5 weight percent.

In addition to the free reactive isocyanate groups, the suitable isocyanate further comprises at least one cyclic, aromatic, aliphatic, linear, branched, or substituted hydrocarbon moiety R containing from 1 to about 20 carbon atoms, such as arylenes, aralkylenes, alkylenes, or cycloalkylenes. When multiple cyclic or aromatic groups are present, linear, branched or substituted hydrocarbons containing from 1 to about 10 carbon atoms can be present as spacers between such cyclic or aromatic groups. In some cases, the cyclic or aromatic group(s) may be substituted at the 2-(ortho-), 3-(meta-), and/or 4-(para-) positions. Substituted groups may include, but are not limited to, halogens, cyano groups, amine groups, silyl groups, hydroxyl groups, acid groups, alkoxy groups, primary or secondary or tertiary hydrocarbon groups, or a combination of two or more groups thereof. Any and all of the isocyanates disclosed herein may be used alone or in combination of two or more thereof.

Preferred isocyanates include diisocyanates (having two NCO groups per molecule), dimerized uretdiones thereof, trimerized isocyanurates thereof, and polyisocyanates such as monomeric triisocyanates. Diisocyanates typically have the generic structure of OCN—R—NCO. Exemplary diisocyanates include, but are not limited to, unsaturated isocyanates such as: p-phenylene diisocyanate ("PPDI," i.e., 1,4-phenylene diisocyanate), m-phenylene diisocyanate ("MPDI," i.e., 1,3-phenylene diisocyanate), o-phenylene diisocyanate (i.e., 1,2-phenylene diisocyanate), 4-chloro-1,3-phenylene diisocyanate, toluene diisocyanate ("TDI"), m-tetramethylxylene diisocyanate ("m-TMXDI"), p-tetramethylxylene diisocyanate ("p-TMXDI"), 1,2-, 1,3-, and 1,4-xylene diisocyanates, 2,2'-, 2,4'-, and 4,4'-biphenylene diisocyanates, 3,3'-dimethyl-4,4'-biphenylene diisocyanate ("TODI"), 2,2'-, 2,4'-, and 4,4'-diphenylmethane diisocyanates ("MDI"), 3,3'-dimethyl-4,4'-diphenylmethane diisocyanate, carbodiimide-modified MDI, polyphenylene polymethylene polyisocyanate ("PMDI," i.e., polymeric MDI), 1,5-naphthalene diisocyanate ("NDI"), 1,5-tetrahydronaphthalene diisocyanate, anthracene diisocyanate, tetracene diisocyanate; and saturated isocyanates such as: 1,4-tetramethylene diisocyanate, 1,5-pentamethylene diisocyanate, 2-methyl-1,5-pentamethylene diisocyanate, 1,6-hexamethylene diisocyanate ("HDI") and isomers thereof, 2,2,4- and 2,4,4-trimethylhexamethylene diisocyanates, 1,7-heptamethylene diisocyanate and isomers thereof, 1,8-octamethylene diisocyanate and isomers thereof, 1,9-novamethylene diisocyanate and isomers thereof, 1,10-decamethylene diisocyanate and isomers thereof, 1,12-dodecane diisocyanate and isomer thereof, 1,3-cyclobutane diisocyanate, 1,2-, 1,3-, and 1,4-cyclohexane diisocyanates, 2,4- and 2,6-methylcyclohexane diisocyanates ("HTDI"), isophorone diisocyanate ("IPDI"), isocyanatomethylcyclohexane isocyanate, isocyanatoethylcyclohexane isocyanate, bis(isocyanatomethyl)cyclohexane (i.e., 1,4-cyclohexane-bis (methylene isocyanate)), 4,4'-dicyclohexylmethane diisocyanate ("$H_{12}$MDI," i.e., bis(4-isocyanatocyclohexyl)-methane), 2,4'- and 4,4'-dicyclohexane diisocyanates, 2,4'- and 4,4'-bis(isocyanatomethyl) dicyclohexanes. Dimerized uretdiones of diisocyanates and polyisocyanates include, for example, unsaturated isocyanates such as uretdiones of toluene diisocyanates, uretdiones of diphenylmethane diisocyanates; and saturated isocyanates such as uretdiones of hexamethylene diisocyanates. Trimerized isocyanurates of diisocyanates and polyisocyanates include, for example, unsaturated isocyanates such as trimers of diphenylmethane diisocyanate, trimers of tetramethylxylene diisocyanate, isocyanurates of toluene diisocyanates; and saturated isocyanates such as isocyanurates of isophorone diisocyanate, isocyanurates of hexamethylene diisocyanate, isocyanurates of trimethyl-hexamethylene diisocyanates. Monomeric triisocyanates include, for example, unsaturated isocyanates such as 2,4,4'-diphenylene triisocyanate, 2,4,4'-diphenylmethane triisocyanate, 4,4',4"-triphenylmethane triisocyanate; and saturated isocyanates such as 1,3,5-cyclohexane triisocyanate.

Among the above-listed isocyanates, all of the saturated isocyanates display satisfactory light stability when used in golf balls cover layers, and are most preferred in golf ball outer cover layer or coating compositions. Other relatively light-stable isocyanates include some of the unsaturated isocyanates, particularly those that are araliphatic, including 1,2-, 1,3-, and 1,4-xylene diisocyanates, m-tetramethylxylene diisocyanate, p-tetramethylxylene diisocyanate, uretdiones of toluene diisocyanates, isocyanurates of toluene diisocyanates, and isocyanurates of diphenylmethane diisocyanates.

Isocyanate-terminated oligomers or polymers include any oligomers, polymers, prepolymers, or quasi-prepolymers having at least two free reactive isocyanate groups as terminal groups, and optionally more pendant isocyanate groups, on the oligomeric or polymeric backbones. Isocyanate-terminated prepolymers and quasi-prepolymers are well known to the skilled artisan, and include, but are not limited to, the reaction products of any one or combination of two or more of the isocyanates listed above and any one or combination of two or more of the polyahls disclosed herein below. It is well understood in the art that material hardness of polyureas, polyurethanes, and polyurethane/polyurea hybrids may be modified by adjusting the percent NCO content in the isocyanate-terminated prepolymer. Conventionally, the isocyanate-terminated prepolymer has less than about 30% NCO, preferably no greater than about 15% NCO. A percent NCO of about 4% to about 9% may provide a relatively soft elastomer (polyurethane, polyurea, or hybrid thereof) preferably suitable for use in golf ball covers or outer cover layers. A percent NCO of about 7% to about 15% may provide a relatively hard elastomer preferably suitable for use in golf ball intermediate layers, outer core layer, and/or inner cover layers.

The above-described polyahls, present by about 1 weight percent to about 100 weight percent in a blend, may be blended with one or more polyahls known to one of ordinary skill in the art to form the polyurethane prepolymers or polyurea prepolymers. Suitable polyahls for the blend may be organic, modified organic, saturated, aliphatic, alicyclic, unsaturated, aralphatic, aromatic, substituted, or unsubstituted. The polyahl preferably has two or more reactive hydrogen groups per molecule, such as primary or secondary hydroxy groups or amine groups, and at least one cyclic, aromatic, aliphatic, linear, branched, or substituted hydrocarbon moiety containing from 1 to about 20 carbon atoms, such as arylenes, aralkylenes, alkylenes, or cycloalkylenes. When multiple cyclic or aromatic groups are present, linear, branched or substituted hydrocarbons containing from 1 to about 10 carbon atoms can be present as spacers between such cyclic or aromatic groups. In some cases, the cyclic or aromatic group(s) may be substituted at the 2-(ortho-), 3-(meta-), and/or 4-(para-) positions. Substituted groups may include, but are not limited to, halogens, cyano groups, amine groups, silyl groups, hydroxyl groups, acid groups, alkoxy groups, primary or secondary or tertiary hydrocarbon groups, or a combination of two or more groups thereof. The isocyanate-reactive hydroxy and/or amine groups may be terminal or pendant groups on the oligomeric or polymeric backbone, and in the case of secondary amine groups, may even be embedded within the backbone. Any and all of the polyahls disclosed herein may be used alone or in combination of two or more thereof.

Suitable polyols have a molecular weight of at least about 200 and at least two primary or secondary hydroxyl terminal groups per molecule, and include, but are not limited to: polyether polyols such as PTMEG, modified PTMEG, poly(oxyethylene) glycol, poly(oxypropylene) glycol, poly(oxyethylene-oxypropylene) glycol, (ethylene oxide)-capped poly(oxypropylene) ether glycol; polyester polyols such as poly(ethylene adipate) glycol, poly(butylene adipate) glycol, poly(hexamethylene adipate) glycol, poly(ethylene propylene adipate) glycol, poly(ethylene butylene adipate) glycol, poly(hexamethylene butylene adipate) glycol, (o-phthalate-1,6-hexanediol)-based polyester polyol, poly(ethylene terephthalate)-based polyester polyol; polycaprolactone polyols such as (alkylene oxide)-initiated polycaprolactones, (ethylene glycol)-initiated polycaprolactone, (diethylene glycol)-initiated polycaprolactone, (propylene glycol)-initiated polycaprolactone, (dipropylene glycol)-initiated polycaprolactone, 1,4-butanediol-initiated polycaprolactone, trimethylolpropane-initiated polycaprolactone, (neopentyl glycol)-initiated polycaprolactone, 1,6-hexanediol-initiated polycaprolactone, PTMEG-initiated polycaprolactone; polycarbonate polyols such as poly(phthalate carbonate) glycol, poly(hexamethylene carbonate) glycol, (bisphenol A)-based polycarbonate glycols; polyhydrocarbon polyols such as polyisoprene polyol, poly(hydrogenated isoprene) polyol, hydroxy-terminated liquid isoprene rubber, polybutadiene polyol, poly(hydrogenated butadiene) polyol (like Polytail H and Polytail HA from Mitsubishi Kasei Corp.), poly(ethylene-co-propylene) polyol, poly(ethylene-co-butylene) polyol, poly(alkylene-co-styrene) polyol, Kraton® polyols, glycerol-based polyols, (castor oil)-based polyols; polyols converted from acid functional oligomers or polymers (or ionomers thereof derived from partial or full neutralization with organic or inorganic cations), such as dimerate or trimerate polyols of fatty acids or isostearic acid; and other polyols such as polyolefin polyols and polyamide polyols.

Saturated members of the above-listed polyols (aliphatic, alicyclic, or fully hydrogenated) are preferred for use in the present invention, because they afford superior light stability when incorporated into the golf ball cover composition. Exemplary saturated polyols include, but are not limited to, PTMEG, modified PTMEG, poly(oxyethylene) glycol, poly(oxypropylene) glycol, poly(oxyethylene-oxypropylene) glycol, (ethylene oxide)-capped poly(oxypropylene) ether glycol, poly(ethylene adipate) glycol, poly(butylene adipate) glycol, poly(hexamethylene adipate) glycol, poly(ethylene propylene adipate) glycol, poly(ethylene butylene adipate) glycol, poly(hexamethylene butylene adipate) glycol, (alkylene oxide)-initiated polycaprolactones, (ethylene glycol)-initiated polycaprolactone, (diethylene glycol)-initiated polycaprolactone, (propylene glycol)-initiated polycaprolactone, (dipropylene glycol)-initiated polycaprolactone, 1,4-butanediol-initiated polycaprolactone, trimethylolpropane-initiated polycaprolactone, (neopentyl glycol)-initiated polycaprolactone, 1,6-hexanediol-initiated polycaprolactone, PTMEG-initiated polycaprolactone, poly(hexamethylene carbonate) glycol, saturated poly(hydrogenated isoprene) polyol, saturated poly(hydrogenated butadiene) polyol, poly(ethylene-co-propylene) polyol, poly(ethylene-co-butylene) polyol, poly(alkylene-co-styrene) polyol, Kraton® polyols, saturated dimerate or trimerate polyols of fatty acids or isostearic acid, saturated polyolefin polyols, saturated polyamide polyols, saturated glycerol-based polyols, and saturated (castor oil)-based polyols.

Suitable polyamines preferably have a molecular weight of at least about 200 and at least two primary or secondary amine terminal groups per molecule. Because lower molecular weight amine-terminated polymers may be prone to forming solids, a high molecular weight of at least about 1,000 is more preferred. Exemplary polyamines include, but are not limited to: polyether polyamines such as polyoxyalkylene diamines, polyoxyethylene diamines, polyoxypropylene diamines, poly(oxyethylene-oxypropylene) diamines, polyoxypropylene triamine, poly(tetramethylene ether) diamines, (ethylene oxide)-capped polyoxypropylene ether diamines, poly(triethyleneglycol) diamines, poly(trimethylolpropane) triamines, polyethyleneglycol-di(p-aminobenzoate), polytetramethyleneoxide-di(p-aminobenzoate), glycerin-based triamines; and other polyamines such as polyester polyamines, polycaprolactone polyamines, polycarbonate polyamines, polyhydrocarbon polyamines, polyamines converted from acid functional oligomers or polymers or ionomers thereof, polyolefin polyamines, and polyamide polyamines. Any of these polyamines may be prepared from the above-listed polyols through reductive amination of polyether polyols with ammonia and hydrogen in the presence of a catalyst, hydrogenation of cyanoethylated polyols, amination of polyol/sulfonic acid esters, reacting polyols with epichlorohydrin and a primary amine, or any other methods known to the skilled artisan.

Exemplary polyamines converted from the polyols above include, without limitation, polytetramethylene ether diamine, modified polytetramethylene ether diamine, poly(tetrahydrofuran-co-methyltetrahydrofuran) ether diamine, poly(oxyethylene) diamine, poly(oxypropylene) ether diamine or triamine, poly(oxyethylene-oxypropylene) diamine, (ethylene oxide)-capped poly(oxypropylene) diamine, poly(ethylene adipate) diamine, poly(butylene adipate) diamine, poly(hexamethylene adipate) diamine, poly(ethylene propylene adipate) diamine, poly(ethylene butylene adipate) diamine, poly(hexamethylene butylene adipate) diamine, (o-phthalate-1,6-hexanediol)-based polyester polyamine, poly(ethylene terephthalate)-based polyester polyamine, (alkylene oxide)-initiated polycaprolactone polyamine, (ethylene glycol)-initiated polycaprolactone polyamine, (diethylene glycol)-initiated polycaprolactone polyamine, (propylene glycol)-initiated polycaprolactone polyamine, (dipropylene glycol)-initiated polycaprolactone polyamine, 1,4-butanediol-initiated polycaprolactone polyamine, trimethylolpropane-initiated polycaprolactone polyamine, (neopentyl glycol)-initiated polycaprolactone polyamine, 1,6-hexanediol-initiated polycaprolactone polyamine, (polytetramethylene ether glycol)-initiated polycaprolactone polyamine, poly(phthalate carbonate) diamine, poly(hexamethylene carbonate) diamine, (bisphenol A)-based polycarbonate diamines, polyisoprene polyamine, poly(hydrogenated isoprene) polyamine, amine-terminated liquid isoprene rubber, polybutadiene polyamine, poly(hydrogenated butadiene) polyamine, poly(ethylene-co-propylene) polyamine, poly(ethylene-co-butylene) polyamine, poly(alkylene-co-styrene) polyamine, glycerol-based polyamines, (castor oil)-based polyamines, dimerate or trimerate polyamines of fatty acids or isostearic acid, or acid functional polyamines. Saturated (aliphatic, alicyclic, or fully hydrogenated) polyamines are preferred for use in golf balls to provide superior light stability, and include polyoxyalkylene diamines, polyoxyethylene diamines, polyoxypropylene diamines, poly(oxyethylene-oxypropylene) diamines, polyoxypropylene triamines, poly(tetramethylene ether) diamines, (ethylene oxide)-capped polyoxypropylene ether diamines, poly(triethyleneglycol) diamines, poly(trimethylolpropane) triamines, saturated glycerin-based triamines, saturated polyester polyamines, saturated polycaprolactone polyamines, saturated polycarbonate polyamines, saturated polyhydrocarbon polyamines, saturated acid functional polyamines, saturated polyolefin polyamines, and saturated polyamide polyamines.

The above-listed polyahls, particularly those having a molecular weight of less than about 10,000, preferably less than about 5,000, may optionally be used as curing agents for chain-extension and/or crosslink in a polyurethane or polyurea composition. In particular, the curing agents react with polyurethane prepolymers or polyurea prepolymers, including the ones discussed above, to afford the desired golf ball compositions. Other suitable curing agents for the invention include polyahls and epoxies, preferably hydroxy curatives, amine curatives, and amino alcohol curatives. Suitable hydroxy curatives have a molecular weight of about 50 to about 5,000, and include, but are not limited to, unsaturated diols such as 1,3-bis(2-hydroxyethoxy) benzene, 1,3-bis[2-(2-hydroxyethoxy)ethoxy] benzene, N,N-bis($\beta$-hydroxypropyl)aniline, 1,3-bis {2-[2-(2-hydroxyethoxy)ethoxy]ethoxy} benzene, hydroquinone-di($\beta$-hydroxyethyl)ether, resorcinol-di($\beta$-hydroxyethyl)ether; saturated diols such as ethylene glycol, diethylene glycol, polyethylene glycol, propylene glycol, dipropylene glycol, polypropylene glycol, 2-methyl-1,3-propanediol, 1,2-, 1,3-, 1,4-, or 2,3-butanediols, 2-methyl-1,4-butanediol, 2,3-dimethyl-2,3-butanediol, 1,5-pentanediol, 1,6-hexanediol, dimethylolcyclohexane, 1,3-bis(2-hydroxyethoxy)cyclohexane, 1,3-bis[2-(2-hydroxyethoxy)ethoxy]cyclohexane, 1,3-bis {2-[2-(2-hydroxyethoxy)ethoxy]ethoxy}cyclohexane; unsaturated triols such as castor oil (i.e., triricinoleoyl glycerol); saturated triols such as 1,2,4-butanetriol, 1,2,6-hexanetriol, trimethylolethane (i.e., 1,1,1-tri(hydroxymethyl)ethane), trimethylolpropane (i.e., 2,2-di(hydroxymethyl)-1-butanol), triethanolamine, triisopropanolamine; unsaturated tetraols such as 2,4,6-tris(N-methyl-N-hydroxymethyl-aminomethyl)phenol; saturated tetraols such as pentaerythritol (i.e., tetramethylolmethane), tetrahydroxypropylene ethylenediamine (i.e., N,N,N',N'-tetrakis(2-hydroxypropyl)-ethylenediamine); and other monomeric polyols such as mannitol (i.e., 1,2,3,4,5,6-hexanehexol) and sorbitol (an enantiomer of mannitol) (both saturated).

Suitable amine curatives have a molecular weight of about 50 to about 5,000, and include, but are not limited to, unsaturated diamines such as m-phenylenediamine, p-phenylenediamine, 1,2- or 1,4-bis(sec-butylamino)-benzene, 3,5-diethyl-(2,4 or 2,6)-toluenediamine, 3,5-dimethylthio-(2,4 or 2,6)-toluenediamine, 3,5-diethylthio-(2,4 or 2,6)-toluenediamine, 4,4'-diamino-diphenylmethane (i.e., 4,4'-methylene-dianiline or "MDA"), 3,3'-dimethyl-4,4'-diamino-diphenylmethane, 3,3'-diethyl-5,5'-dimethyl-4,4'-diamino-diphenylmethane (i.e., 4,4'-methylene-bis(2-ethyl-6-methyl-benzeneamine)), 3,3'-dichloro-4,4'-diamino-diphenylmethane (i.e., 4,4'-methylene-bis(2-chloroaniline) or "MOCA"), 3,3'-diethyl-5,5'-dichloro-4,4'-diamino-diphenylmethane, 3,3',5,5'-tetraethyl-4,4'-diamino-diphenylmethane (i.e., 4,4'-methylene-bis(2,6-diethylaniline) or "MDEA"), 2,2'-dichloro-3,3',5,5'-tetraethyl-4,4'-diamino-diphenylmethane (i.e., 4,4'-methylene-bis(3-chloro-2,6-diethyleneaniline or "MCDEA"), 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di(p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediylbis-(oxy)bis]-1-propanamine), diethyleneglycol-bis(propylamine) (i.e., diethyleneglycol-di(aminopropyl)ether), 4,7,10-trioxatridecane-1,13-diamine, polyoxyethylene diamines, polyoxypropylene diamines, poly(oxyethylene-oxypropylene) diamines, (ethylene oxide)-capped polyoxypropylene ether diamines, polytetramethylene ether diamines, 1-methyl-2,6-diamino-cyclohexane, 1,4-diamino-cyclohexane, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, 3,3'-diethyl-5,5'-dimethyl-4,4'-diamino-dicyclohexylmethane, 3,3'-diethyl-5,5'-dichloro-4,4'-diamino-dicyclohexylmethane, 3,3',5,5'-tetraethyl-4,4'-diamino-dicyclohexylmethane (i.e., 4,4'-methylene-bis(2,6-diethylaminocyclohexane)), 2,2'-dichloro-3,3',5,5'-tetraethyl-4,4'-diamino-dicyclohexylmethane, 3,3'-dichloro-4,4'-diamino-dicyclohexylmethane, 3,3'-dichloro-2,2',6,6'-tetraethyl-4,4'-diamino-dicyclohexylmethane, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), trimethylolpropane-based triamines, glycerin-based triamines, N-(2-aminoethyl)-1,3-propylenediamine (i.e., $N_3$-amine) (all saturated); tetramines such as triethylene tetramine, N,N'-bis(3-aminopropyl)ethylenediamine (i.e., $N_4$-amine) (both saturated); and other polyamines such as tetraethylene pentamine (also saturated).

Suitable amino alcohol curatives may be monomeric, oligomeric, or polymeric, having at least one free reactive hydroxy group and at least one free reactive amine group. The hydroxy and amine groups may be terminal or pendant groups on the oligomeric or polymeric backbone, and in the case of secondary amine groups, may even be embedded within the backbone. Non-limiting examples of monomeric amino alcohol curatives include monoethanolamine (saturated), monoisopropanolamine (saturated), diethanolamine (saturated), diisopropanolamine (saturated), and 2-propanol-1,1'-phenylaminobis (unsaturated).

For best light stability, all reactants in the polyurethane or polyurea compositions are preferably saturated, including the curing agents, the polyahls, and the isocyanates. Most preferred saturated curatives are 4,4'-bis-(sec-butylamino)-dicyclohexylmethane, 2,3-dimethyl-2,3-butanediol, 2-methyl-1,3-propanediol, 2-methyl-1,4-butanediol, 1,4-butanediol, and 1,4-cyclohexyldimethyol. In one embodiment, a hindered secondary diamine having a high level of stearic hindrance, such as 4,4'-bis(sec-butylamino)-dicyclohexylmethane (Clearlink® 1000), N,N'-di (ethylmaleate-amino)-dicyclohexylmethane (i.e., 4,4'-bis (diethylsuccinato-amino)-dicyclohexylmethane, Desmophen® NH 1420), N,N'-di(ethylmaleate-amino)-dimethyl-dicyclohexylmethane (i.e., 3,3'-dimethyl-4,4'-bis (diethylsuccinato-amino)-dicyclohexylmethane, Desmophen® NH 1520), N,N'-diethylmaleate-2-methyl-pentamethylene diamine (Desmophen® NH 1220), or N,N'-diisopropyl-isophorone diamine, may be used alone or in combination of other curing agent(s) to beneficially slow down the curing process. Clearlink® curatives are available from UOP LLC of Des Plaines, Ill., and Desmophen® NH polyaspartic esters are available from Bayer Corporation of Pittsburgh, Pa. Other secondary diamines and polyamines are disclosed in U.S. Pat. Nos. 5,236,741 and 5,126,170, which are incorporated by reference in their entirety. In another embodiment, a curing agent having a relatively low freezing point may be used as a freezing point depressant. Such dual functional curing agents include, without limitation, 2-methyl-1,3-propanediol and 2-methyl-1,4-butanediol. Other useful freezing point depressants are disclosed in co-pending U.S. patent application Ser. No. 10/339,603, which is incorporated herein by reference in its entirety.

As described above, the polyahls formed at least from the chiral diol or chiral ether of the present invention, particularly the polyether polyahls, may be incorporated into a prepolymer, used as a curing agent, or both, in the elastomeric reaction product that forms the golf ball cover layer. In particular, the polyahls are incorporated into one or more soft segments of the reaction product, and are substantially absent in any hard segments of the reaction product. To form the prepolymer, the polyahl, alone or in a blend with other polyahls disclosed herein, may react with one or more isocyanates at an equivalent ratio of about 0.01:1 to about 1:1. When the polyether polyahl is used alone, the equivalent ratio is preferably about 0.3:1 to about 0.6:1, more preferably about 0.5:1. The weight ratio of the polyether polyahl to any other polyahl(s) in a blend may be about 1:20 to about 20:1. The polyahl used in the prepolymer may have a relatively high molecular weight, preferably at least about bout 500, more preferably from about 500 to about 10,000, and most preferably from about 1,000 to about 5,000. The resulting prepolymer may be a polyurethane prepolymer, a polyurea prepolymer, or a polyurethane/polyurea prepolymer. The above-listed curing agents, used alone or in combination of two or more thereof, may then be used to cure the prepolymer into a thermoplastic or thermoset polyurethane, polyurea, or polyurea/polyurethane hybrid. An equivalent ratio of the prepolymer to the curing agent is preferably about 1:0.6 to about 1:1.5, more preferably about 1:0.8 to about 1:1.2, and most preferably about 1:0.95.

When used as a curing agent, the polyahl may have a molecular weight relative lower than those suitable in the prepolymer, preferably less than about 10,000, more preferably about 200 to about 5,000, and most preferably about 500 to about 3,000. The polyahl curative may be used alone or in combination with other curatives disclosed above. Preferably, the polyahl constitutes at least about 1 weight percent of the total curative mixture, more preferably about 5 weight percent to about 100 weight percent. The polyahl curative alone or in a blend may be used to react with any prepolymers at an equivalent ratio of 0.6:1 to about 1.5 to 1. The prepolymers include those disclosed herein, such as the polyether polyahl-based prepolymers, and any prepolymers formed from any combinations of the polyahls and the isocyanates listed above. Such prepolymers may have only urethane bonds (polyurethane prepolymers), only urea bonds (polyurea prepolymer), or both (polyurethane/polyurea hybrid prepolymer). Preferably, the prepolymer and the reactants therein, the polyahl curative, and any other optional curatives are all saturated.

A variety of additives can optionally be incorporated into the cover layer compositions of the present invention. For example, a catalyst may be employed to promote the reaction between the curing agent and the prepolymer. Suitable catalysts include, but are not limited to, zinc catalysts such as zinc octoate; cobalt (II) octoate, bismuth catalysts; tin catalysts, such as dibutyltin dilaurate (Dabco® T-12), dibutyltin diacetate (Dabco® T-1), dibutyltin maleate, tin (II) ethylhexoate, tin (II) laurate, tin (II) octoate, tin (II) chloride, tin (IV) chloride, dibutyltin dimethoxide (Fascat® 4211), dibutyltin dibutoxide (Fascat® 4214), dimethyl-bis[(1-oxoneodecyl)oxy] stannane (Formez® UL-28), di(n-octyl) tin bis(isooctyl-mercaptoacetate) (Formez® UL-29), 1,3-diacetoxytetrabutyl-stannoxane, and 2-ethylhexyl-titanate; amine catalysts, such as triethylenediamine (Dabco® 33-LV), triethylamine, tributylamine, or N-methylmorpholine; organic acids, such as acetic acid, adipic acid, azelaic acid, octanoic acid, or oleic acid; delayed heated-activated catalysts, such as phenol-blocked 1,8-diazabicyclo(5,4,0)undecene-7 (Polycat™ SA-1/10), Polycat™ SA-102, or Polycat™ 8154.

These catalysts may be used alone or in combination of two or more thereof, and are added in an amount sufficient to catalyze the polymerization reaction, preferably about 0.001 weight percent to about 5 weight percent based on the total weight of the formulation, more preferably about 0.005 weight percent to about 3 weight percent. Unconventionally high levels of catalysts allow lowered processing temperature and mixing speed while retain comparable cure. The tin catalyst amount used is preferably about 0.05 weight percent to about 1 weight percent, more preferably about 0.25 weight percent to about 0.6 weight percent.

In one embodiment, the cover layer composition further comprises at least one UV absorber and/or light stabilizer, preferably hindered amine light stabilizer, to prevent significant yellowing from unsaturated components contained therein, and to prevent cover surface fractures due to photodegradation. These UV absorbers and light stabilizers are particularly useful in visible cover layers, such as the outer cover layer, or any other internal layer when the layer(s) disposed about it are translucent or transparent. Suitable UV absorbers include Uvinul® DS49 (disodium 2,2'-dihydroxy- 4,4'-dimethyoxy-5,5'-disulfobenzophenone) and Uvinul® DS50 (2,2',4,4'-tetrahydroxy-benzophenone) by BASF Corporation; Tinuvin® 328 (2-(2'-hydroxy-3',5'-di(t-amylphenyl)benzotriazole), Tinuvin® 571 (2-(2H-benzotriazol-2-yl)-6-dodecyl-4Tinuvin® P (2-(2-hydroxy-5-methylphenyl)benzotriazole), and CGL 1545 (experimental triazine derivative) by Ciba Specialty Chemicals Corporation; Sanduvor® PR-25 (dimethyl-4-methoxy-benzylidenemalonate) by Clariant Corporation; Cyasorb® UV-2337 (2-(2'-hydroxy-3',5'-di(t-amylphenyl) benzotriazole), Cyasorb® UV-1164 (2-(4,6-bis(2,4-dimethylphenyl)-1,3,5-triazin-2-yl)-5-octyloxyphenol), and Cyasorb® UV-3638 (2,2'-(1,4-phenylene)-bis(4-3,1-benzoxazin-4-one)) by Cytec Industries; Quercetin®(3,3',4', 5,7-pentahydroxy flavone) by EM Industries; UV-Chek® AM-300 (2-hydroxy-4-n-octyloxy-benzophenone) and UV-Chek® AM-340 (2,4-di(t-butylphenyl)-3,5-di(t-butyl)-4-hydroxybenzoate) by Ferro Corporation; Maxgard® DPA-8 (2-ethylhexyl-2-cyano-3,3-diphenylacrylate) by Garrison Industries; Givsorb® 2 (propanedione), Givsorb® 13, Givsorb® 14, and Givsorb® 15 by Givaudan-Roure Corporation; Norbloc® 6000 (2-(2'-hydroxy-5'-(2-hydroxyethl)benzotriazole) and Norbloc® 7966 (2-(2'-hydroxy-5'-methacryloxyethylphenyl)-2H-benzotriazole) by Jessen Pharmaceuticals. Suitable light stabilizers include, but are not limited to, Tinuvin® 622LD (dimethyl succinate polymer with 4-hydroxy-2,2,6,6-tetramethyl-1-piperidine ethanol) and Tinuvin® 765 (bis(1,2,2,6,6-pentamethyl-4-piperidinyl)sebacate) by Ciba Specialty Chemicals Corporation; Sanduvor® 3070 (hindered amine) by Clariant Corporation; Cyasorb® UV-3581 (3-dodecyl-1-(2,2,6,6-tetramethyl-4-piperidylpyrrolidin-2,5-dione) by Cytec Industries. For aromatic and unsaturated formulations, the preferred UV absorber is Tinuvin® 328, and the preferred hindered amine light stabilizer is Tinuvin® 765. A preferred light stabilizer for saturated formulations is Tinuvin® 292. In addition, Tinuvin® 213 and 770, and antioxidants to prevent degradation of the cover composition, such as Irganox® 1010 (tetrakis(3,5-di(t-butyl-hydroxyhydrocinnamate))methane) and Irganox® 1135 ($C_{7-9}$- branched alkyl ester of 3,5-di(t-butyl-4-hydroxyhydrocinnamic acid) by Ciba Specialty Chemicals Corporation and Sandostab® P-EPQ (aryl phosphonite) by Clariant Corporation, are also applicable.

Other additive for the cover layer compositions of the present invention include, but are not limited to, accelerators to speed up the polymerization reaction, fillers to adjust density and/or modulus of the layer, viscosity modifiers, release agents, plasticizers, compatibilizing agents, coupling agents, dispersing agents, colorants including pigments and dyes, optical brighteners, surfactants, lubricants, stabilizers, metals, processing aids or oils to affect rheological and mixing properties, blowing agents, and any other modifying agents known to one of ordinary skill in the art. Pigments may be fluorescent, autofluorescent, luminescent, or chemoluminescent, and include white pigments such as titanium oxide and zinc oxide. These additives may be blended into the cover layer composition in amounts sufficient to achieve their specific purposes and desired effects.

As used herein, the term "filler" refers to any compound or composition that can be used to vary certain properties of selected portions of the golf ball, including density or specific gravity, flexural modulus, tensile modulus, strength, moment of inertia, hardness, abrasion resistance, weatherability, volume, weight, etc. The fillers are preferably in the forms of nano-scale or micro-scale powders, fibers, filaments, flakes, whiskers, wires, tubes, or particulates for homogenous dispersion. Suitable fillers for golf balls may be solid or hollow, and include, for example, metal (or metal alloy) powder, metal oxide and salts, ceramics, particulates, carbonaceous materials, polymeric materials, glass microspheres, and the like or blends thereof. Non-limiting examples of metal (or metal alloy) powders include, but are not limited to, bismuth, brass, bronze, cobalt, copper, inconel, iron, molybdenum, nickel, stainless steel, titanium, aluminum, tungsten, beryllium, zinc, magnesium, manganese, and tin. Non-limiting examples of metal oxides and salts include, but are not limited to, zinc oxide, iron oxide, aluminum oxide, titanium dioxide, magnesium oxide, zirconium oxide, tungsten trioxide, zirconium oxide, tungsten carbide, tungsten oxide, tin oxide, zinc sulfide, zinc sulfate, zinc carbonate, barium sulfate, barium carbonate, calcium carbonate, calcium metasilicate, magnesium carbonate, and silicates. Non-limiting examples of carbonaceous materials include graphite and carbon black. Examples of other useful fillers include precipitated hydrated silica, boron, clay, talc, glass fibers, aramid fibers, mica, diatomaceous earth, regrind (typically recycled core material mixed and ground to 30 mesh particle size). Examples of polymeric materials include, but are not limited to, hollow spheres or microspheres of chemically or physically foamed thermoplastic or thermosetting polymers, such as epoxies, urethanes, polyesters, nucleated reaction injection molded polyurethanes or polyureas.

Conventional materials for golf ball cover, intermediate layer, or core that may be blended with the polyurethane, polyurea, or hybrid compositions of the present invention, by about 1 weight percent to about 95 weight percent of the composition, include:

1) Non-ionomeric acid polymers, such as copolymers E/Y of an olefin E having 2 to 8 carbon atoms and a carboxylic acid Y having 3 to 8 carbon atoms, or terpolymers E/X/Y having an additional softening comonomer X. The olefin E is preferably ethylene, and the acid Y includes acrylic, methacrylic, crotonic, maleic, fumaric, or itaconic acid. The comonomer X includes vinyl esters of aliphatic carboxylic acids having 2 to 10 carbon atoms, and alkyl ethers, alkyl acrylates, or alkyl alkylacrylates of alkyl groups having 1 to 10 carbon atoms. Depending on the acid content by weight, the polymer may be referred to as low acid (about 2% to less than 10%), medium acid (about 10% to less than 16%), and high acid (about 16% to about 50%). The comonomer, when present, may be in an amount of about 2% to about 40% by weight of the acid polymer. Preferred non-ionomeric acid polymers include Nucrel® from E. I. DuPont de Nemours & Company and Escor® from ExxonMobil.

2) Anionic and cationic ionomers such as the acid polymers above partially or fully neutralized with organic or inorganic cations, such as zinc, sodium, lithium, magnesium, potassium, calcium, manganese, nickel, ammonium (primary, secondary, tertiary), or the like. The extent of neutralization ranges from about 0% to about 100% or more, preferably at least about 50%, more preferably at least about 70%. Preferred acid ionomers include Surlyn® from E. I. DuPont de Nemours & Company and Iotek® from ExxonMobil.

3) Thermoplastic or thermoset (vulcanized) synthetic or natural rubbers, including polyolefins and copolymers or blends thereof, such as balata, polyethylene, polypropylene, polybutylene, isoprene rubber, ethylene-propylene rubber, ethylene-butylene rubber, ethylene-propylene-(non-conjugated diene) terpolymers; polystyrenes and copolymers thereof, such as styrene-butadiene copolymers, poly(styrene-co-maleic anhydride), acrylonitrile-butylene-styrene copolymers, poly(styrene sulfonate); and homopolymers or copolymers produced using single-site catalyst such as metallocene (grafted or non-grafted).

4) Polyphenylene oxide resins, polyarylene ethers, or blends of polyphenylene oxide with high impact polystyrene such as Noryl® from General Electric Company.

5) Polyurethanes prepared from polyols and diisocyanates or polyisocyanates, including thermoplastic polyurethanes, thermoset polyurethanes, and polyurethane ionomers.

6) Polyurea such as thermoplastic polyurea, thermoset polyurea, polyurea ionomers, and include those disclosed in U.S. Pat. No. 5,484,870 and U.S. patent application Ser. Nos. 10/072,395 and 10/228,311, all of which are incorporated herein by reference in their entirety.

7) Aliphatic and/or aromatic thermoplastics, including polyesters, such as ethylene methylacrylate, ethylene ethylacrylate, ethylene vinyl acetate, poly(ethylene terephthalate), poly(butylene terephthalate), poly(propylene terephthalate), poly(trimethylene terephthalate), modified poly(ethylene terephthalate)/glycol, poly(ethylene naphthalate), cellulose esters, Hytrel® from E. I. DuPont de Nemours & Company, and Lomod® from General Electric Company; polycarbonates; polyacetals; polyimides; polyetherketones; polyamideimides; thermoplastic block copolymers (Kraton® rubbers from Shell Chemical); co-polyetheramides (Pebax® from AtoFina); and elastomers in general.

8) Vinyl resins such as polyvinyl alcohols, polyvinyl alcohol copolymers, polyvinyl chloride, block copolymers of alkenyl aromatics with vinyl aromatics and polyesteramides, copolymers of vinyl chloride with vinyl acetate, acrylic esters or vinylidene chloride.

9) Polyamides such as poly(hexamethylene adipamide) and others prepared from diamines, fatty acids, dibasic acids, and amino acids (poly(caprolactam)), and blends of polyamides with Surlyn®), ethylene homopolymers or copolymers or terpolymers, etc.

10) Acrylic resins and blends of these resins with polyvinyl chloride or other elastomers.

11) Blends and alloys, including blends of polycarbonate and acrylonitrile-butylene-styrene, blends of polycarbonate and polyurethane, blends of polyvinyl chloride with acrylonitrile-butadiene-styrene or ethylene vinyl acetate or other elastomers, blends of thermoplastic rubbers with polyethylene or polypropylene.

Preferably, a thermoplastic polyurethane, polyurea, or polyurethane/polyurea hybrid of the present invention is blended with one or more thermoplastic materials listed above to form a thermoplastic composition for a golf ball portion.

The cover layer may be formed from a thermoplastic or thermoset polyurethane or polyurea, such as the ones disclosed herein. Preferably the polyurethane or polyurea is saturated. The cover layer may have a WVTR of less than about 2 g/(m²×day), a modulus of about 1,000 to about 100,000 psi, a material hardness of less than about 90 Shore D, more preferably less than about 70 Shore D, and a hardness as measured on the ball of less than about 80 Shore D. In one embodiment, the cover layer has a Shore D hardness of about 30 to about 70 and a modulus of about 10,000 psi to about 80,000 psi. The cover layer may have any thickness of less than about 0.5 inches, preferably thin with a thickness of less than about 0.05 inches, more preferably about 0.005 inches to about 0.03 inches. Alternatively, the cover layer is relatively thick, about 0.05 inches to about 0.2 inches, preferably about 0.05 inches to about 0.1 inches. The cover layer preferably has an inner diameter of about 0.5 inches to about 1.7 inches, and an outer diameter of about 0.7 inches to about 1.8 inches. The golf ball compression is preferably less than about 100.

Any method known to one of ordinary skill in the art may be used to produce the cover layer of the present invention. One-shot method involving concurrent mixing of the isocyanate, the polyether polyahl, and the curing agent is feasible, but the resulting mixture is non-homogenous and difficult to control. The prepolymer method described above is most preferred, because it affords a more homogeneous mixture resulting in a more consistent polymer composition. The prepolymer may be reacted with a diol or a secondary diamine to form a thermoplastic material, or reacted with a triol, tetraol, primary diamine, triamine, or tetramine to form a thermoset material. Other methods suitable for forming the layers include casting, compression molding, reaction injection molding ("RIM"), liquid injection molding ("LIM"), injection-compression molding, pre-reacting the components to form an injection moldable thermoplastic material and then injection molding, and combinations thereof, such as RIM/compression molding, injection/compression molding, progressive compression molding, and the like. Thermoplastic formulations may be processed using any number of compression or injection molding techniques. Thermoset formulations may be castable, reaction injection moldable, sprayable, or applied in a laminate form or by any techniques known in the art. Castable reactive liquid materials such as polyurea, polyurethane, and polyurethane/polyurea hybrid can provide very thin layers such as outer cover layers that are desirable on golf balls. Other techniques include spraying, dipping, spin coating, or flow coating methods.

The core of the golf balls in the present invention may be solid, fluid-filled, gel-filled, or gas-filled. The solid core can be made from any suitable core materials including thermoset plastics, such as natural rubber, polybutadiene, polyisoprene, styrene-butadiene or styrene-propylene-diene rubber, and thermoplastics such as ionomer resins, polyamides, polyesters, or a thermoplastic elastomer. Suitable thermoplastic elastomers include Pebax® from AtoFina Chemicals Inc., Hytrel® from E.I. Du Pont de Nemours and Company, thermoplastic urethane from various manufacturers, and Kraton® from Shell Chemical Company. The core materials can also be formed from a castable material. Suitable castable materials include polyurethanes, polyureas, epoxies, silicones, etc. Additionally, suitable core materials may also include a RIM polyurethane or polyurea, preferably the nucleated versions where nitrogen gas is whipped into the reaction mixture prior to injection into a closed mold to form the layer.

Preferred compositions for solid cores include a base rubber, a crosslinking agent, and an initiator. The base rubber typically includes natural or synthetic rubbers. A preferred base rubber is 1,4-polybutadiene having a cis-bond of at least about 40%, a Mooney viscosity of at least about 30, a molecular weight of at least about 150,000, and a polydispersity of less than about 4. Examples of desirable polybutadiene rubbers include Buna® CB22 and CB23 from Bayer, Ubepol® 360L and 150L from Ube Industries, and Cariflex® BCP820 and BCP824 from Shell Chemical. Blends of two or more such polybutadienes are desirable for the solid cores. In one embodiment, a cobalt or nickel catalyzed polybutadiene having a Mooney viscosity of from about 50 to about 150 is mixed with a neodymium catalyzed polybutadiene having a Mooney viscosity of from about 30 to about 100. The weight ratio between the two polybutadienes may range between about 5:95 and 95:5. The polybutadiene can also be mixed with other elastomers known in the art, such as natural rubber, polyisoprene rubber and/or styrene-butadiene rubber, in order to modify the properties of the core.

Suitable cross-linking agents for the polybutadiene-based solid cores include metal salts of unsaturated fatty acid having 3 to 8 carbon atoms, such as diacrylate, dimethacrylate, and monomethacrylate, wherein the metal can be magnesium, calcium, zinc, aluminum, sodium, lithium or nickel. Preferred acrylates include zinc diacrylate, zinc dimethacrylate, and blends thereof. Zinc diacrylate is preferred because it provides golf balls with a high initial velocity, but the present invention is not limited thereto. The crosslinking agent is typically present in an amount of at least about 10 parts per hundred ("pph") parts of the base polymer, preferably from about 20 pph to about 40 pph of the base polymer.

The peroxide initiators used to promote the cross-linking reaction in the core are well known in the art, and can be any known peroxides or blends thereof that decompose during the cure cycle. Suitable peroxide initiators include organic peroxide compounds, such as dicumyl peroxide, 1,1-di(t-butylperoxy) 3,3,5-trimethyl cyclohexane, α,α-bis (t-butylperoxy) diisopropylbenzene, 2,5-dimethyl-2,5 di(t-butylperoxy) hexane, di-t-butyl peroxide, and blends thereof. Commercially available examples include, but are not limited to, Varox® 231XL and DCP-R from AtoFina, Perkadox® BC and 14 from Akzo Nobel, and Elastochem® DCP-70 from Rhein Chemie. In their pure forms, the initiators are present in an amount of at least about 0.25 pph of the base polymer, preferably between about 0.5 pph and about 2.5 pph. It is understood to one skilled in the art to adjust the amount of the initiators according to their activity and concentration.

In polybutadiene-based solid cores of the present invention, it is preferred to blend in a halogenated organosulfur compound such as a halogenated thiophenol or a metal salt thereof to further enhance the softness and resiliency of the core. The halogenated thiophenol, preferably pentachlorothiophenol ("PCTP") or ZnPCTP, function in part as a cis-to-trans catalyst that convert some cis-1,4 bonds in the polybutadiene into trans-1,4 bonds. The utilization of halogenated organosulfur compounds like PCTP and ZnPCTP in golf balls to produce soft and fast cores is disclosed in co-pending U.S. patent application Ser. No. 09/951,963, which is incorporated by reference herein in its entirety. PCTP is available under the tradename of Struktol® from Struktol Company of America, and ZnPCTP is available from eChinaChem. The halogenated organosulfur compounds are present in an amount of at least about 0.1 pph of the base rubber, preferably about 0.1 pph to about 2 pph; alternatively the amount of halogenated organosulfur compound used is at least about 2 pph, preferably about 2.3 pph to about 5 pph.

The solid core may also include fillers to adjust hardness, strength, modulus, weight, density and/or specific gravity of the core. Suitable fillers include metal or alloy powders, metal oxides and salts, ceramics, particulate, carbonaceous materials, polymeric materials, glass microspheres, and the like or blends thereof. These fillers may be hollow, solid, filled, unfilled, surface treated, or non-surface treated. Specific fillers for the core include tungsten powder, tungsten carbide, zinc oxide, tin oxide, tungsten oxide, barium sulfate, zinc sulfate, barium carbonate, calcium carbonate, zinc carbonate, an array of silica and clay, regrind (recycled core material typically ground to about 30 mesh particle), and high-Mooney-viscosity rubber regrind.

Other optional additives for the golf ball core are well known in the art, and may be blended into the core in amounts sufficient to achieve their specific purposes and desired effects. Such additives include antioxidants to prevent the breakdown of the base polymer, accelerators to speed up the polymerization reaction, processing aids or oils to affect Theological and mixing properties, foaming agents, cis-to-trans catalysts, adhesives, coupling agents, stable free radicals, radical scavangers, scorch retarders, and blends thereof.

The core of the golf ball of the present invention has a diameter of at least about 0.5 inches. In one embodiment, the core diameter is at least about 1 inches, more preferably from about 1.5 inches to about 1.65 inches, and most preferably from about 1.55 inches to about 1.6 inches. The core may have a compression of from about 20 to about 120, more preferably from about 30 to about 100, and most preferably from about 40 to about 80. Alternatively, the core may be very soft, with a compression of less than about 20. The core should also be highly resilient, having a COR of preferably at least about 0.7, more preferably at least about 0.75, and most preferably at least about 0.8. Conventional methods and techniques may be used to form the solid cores from the base compositions disclosed herein.

An optional intermediate layer may be disposed between the core and the cover. The intermediate layer may be part of the core as an outer core layer, or part of the cover as an inner cover layer. The intermediate layer of the golf ball may be made of any core or cover compositions disclosed herein. Alternatively, the intermediate layer may comprise non-ionomeric acid polymers or ionomeric derivatives thereof, polyamides, polyolefins, polyurethanes, polyurea, cast or RIM polyurethanes or polyurea, epoxies, polyesters, polyetheresters such as Hytrel® from DuPont, polyetheramides such as Pebax® from AtoFina, nylons, single-site catalyzed polymers, metallocene-catalyzed polymers, poly(ethylene terephthalate), poly(butylene terephthalate), poly(propylene terephthalate), poly(trimethylene terephthalate), poly (ethylene naphthalate), polystyrene polymers, poly(styrene-co-maleic anhydride), functionalized styrene-butadiene elastomers, styrenic block copolymers such as Kraton® from Shell Chemicals, acrylonitrile-butadiene-styrene copolymers ("ABS"), poly(styrene sulfonate), polyethylene styrene, grafted polypropylenes, grafted polyethylenes, polyvinyl chlorides, grafted polyvinyl chlorides, polyvinyl acetates having less than about 9% of vinyl acetate by weight, polycarbonates, blends of polycarbonate and acrylonitrile-butadiene-styrene, blends of polycarbonate and polyurethane, polyvinyl alcohols, polyvinyl alcohol copolymers, polyethers, polyarylene ethers, polyphenylene oxides, block copolymers of alkenyl aromatics with vinyl aromatics, polyesteramides, polyamides, polyimides, polyetherketones, polyamideimides, silicone, and metal salts of fatty acids. Two or more of these materials may be blended together to form the intermediate layer.

In one embodiment, the intermediate layer is a continuous layer formed from one or more non-ionomeric acid polymers and/or ionomers derived therefrom. The non-ionomeric acid polymer may be an E/Y copolymer or E/X/Y terpolymer, where E is an olefin, Y is a carboxylic acid, and X is a softening comonomer. Preferably, the olefin is ethylene and the carboxylic acid is acrylic acid, methacrylic acid, crotonic acid, maleic acid, fumaric acid, itaconic acid, or a combination thereof. The softening comonomer is preferably vinyl esters of aliphatic carboxylic acids where the acids have 2 to about 10 carbon atoms, or alkyl ethers, alkyl acrylates, or alkyl alkylacrylates where the alkyl groups have 1 to about 10 carbon atoms. The copolymer or terpolymer preferably has an acid content of from about 1% to about 50% by weight, and the terpolymer preferably has a comonomer content of about 2% to about 40%. The acid polymer preferably has a melt flow rate of about 0.1 g/10-min to about 500 g/10-min, a flexural modulus of about 5,000 psi to about 80,000 psi, a Shore D material hardness of about 20 to about 80, and a WVTR of about 0.01 to about 0.9 g/(m$^2$*day) at 38° C. and 90% relative humidity. Specific examples of the non-ionomeric acid copolymer include ethylene/acrylic acid copolymers ("EAA") and ethylene/methacrylic acid copolymers ("EMAA"). Examples of the non-ionomeric acid terpolymer are ethylene/methyl acrylate/acrylic acid terpolymers ("EMAAA"), ethylene/n-butyl acrylate/methacrylic acid terpolymers, and ethylene/isobutyl acrylate/methacrylic acid terpolymers. Commercially, EAA resins are available from Dow Chemical under the trade name of Primacor® and from Exxon-Mobil Chemical under the trade name of Escor®, EMAA resins are available from E. I. du Pont de Nemours and Company under the trade name of Nucrel®, and EMAAA resins are available from ExxonMobil Chemical under the trade name of Escor® AT.

The non-ionomeric acid polymers disclosed herein may be converted to acid ionomers through partial or full neutralization with a organic or inorganic cation such as sodium, lithium, potassium, zinc, magnesium, calcium, or ammonium. Preferred ionomers include high-acid ionomers, high-flow ionomers, high crystalline ionomers, and blends thereof. High-acid ionomers are anionic copolymers or terpolymers having an acid content of at least about 16% by weight. At least about 10% by weight of the carboxylic acid groups are neutralized with a metal cation. Preferably, between about 30% and about 100% of the carboxylic acid groups are neutralized. High-acid ionomers are commercially available from several different manufacturers. For example, ionic copolymers of ethylene and methacrylic acid are produced by E. I. DuPont de Nemours & Company under the trademark of Surlyn®, ionic copolymers and terpolymers of ethylene and acrylic acid are produced by Exxon-Mobil Chemical under the trademarks of Escor® and Iotek®, filler-modified poly(ethylene-methacrylic acid) ionomers are produced by DuPont under the trademark of Bexloy®, ionomeric polyethylene copolymers are produced by A. Schulman Inc. under the trademark of Formion®, and polyolefin ionomers are produced by Diamond & Network Polymers, Inc.

The intermediate layer may incorporate a filler to attain preferred physical and mechanical properties. Preferably, the filler is a modulus-enhancing filler, including tungsten, tungsten oxide, barium sulfate, carbon black, silica, titanium oxide, or a blend thereof. Preferably, the amount of the fillers in the composition ranges from about 5% to about 70% by weight, more preferably from about 10% to about 50% by weight. The composition of the intermediate layer may have a modulus of about 1,000 psi to about 150,000 psi, a material hardness of about 20 Shore C to about 80 Shore D, a thickness of about 0.005 inches to about 0.6 inches, and a hardness as measured on the golf ball of less than about 80 Shore D. The intermediate layer preferably has an outside diameter in the range of 70% to 98% of the finished ball diameter and an inner diameter in the range of 30% to 90% of the finished ball diameter. Alternatively, the intermediate layer may have an inner diameter of about 0.5 inches to about 1.6 inches, and an outside diameter of about 1 inches to about 1.65 inches. To prevent or minimize the penetration of moisture, typically water vapor, into the core, the intermediate layer preferably has a WVTR lower than that of the cover. More preferably, the WVTR of the intermediate layer is no greater than that of an ionomer resin such as Surlyn®, which is in the range of about 0.45 g/(m$^2$×day) to about 0.95 g/(m$^2$×day).

The composition of the intermediate layer may be applied as a liquid, powder, dispersion, lacquer, paste, gel, melt, or solid half shells. The intermediate layer may be formed around the core or onto the inside of the cover by sheet stock or vacuum shrink-wrapping, compression molding, injection molding, vacuum deposition, RIM, lamination, casting, spraying, dipping, powder coating, or any other deposition means. Preferably, a combination of these methods is used, such as injection/compression molding, RIM/compression molding, pre-form/compression molding, injection molding/grinding, injection/progressive compression molding, or co-injection molding. A simplified casting method using a single block material to produce the intermediate layer can be utilized to make any castable components of the golf ball, including any intermediate layer, the innermost core or any portion of the cover.

The resulting golf ball, including the core, the intermediate layer and the cover as described above, preferably has a COR of greater than about 0.7, and more preferably greater than about 0.8. The golf ball preferably has an Atti compression of at least about 30, more preferably from about 50 to about 120, and most preferably from about 50 to about 90. The golf ball preferably has an overall diameter of at least about 1.68 inches, more preferably from about 1.68 inches to about 1.76 inches. The golf ball further has a dimple coverage on its outermost surface of greater than about 60%, preferably greater than 70%. Preferred dimple patterns involving catenary curves, and preferred lift and drag characteristics of the golf ball of the present invention are disclosed in co-pending U.S. application Ser. Nos. 09/989,191 and 10/096,852, respectively, both incorporated herein by reference in their entirety.

Golf balls of the present invention may have a variety of constructions, typically comprising at least a core and a cover. Optionally, one or more intermediate layers may be disposed between the core and the cover; the core may be a single solid mass, or include a solid, liquid-filled, gel-filled or gas-filled center and one or more outer core layers; and the cover may include an outer cover layer and one or more inner cover layers. Any of the outer core layers, the intermediate layers, or the inner cover layers may be a continuous layer, a discontinuous layer, a wound layer, a molded layer, a lattice network layer, a web or net, an adhesion or coupling layer, a barrier layer, a layer of uniformed or non-uniformed thickness, a layer having a plurality of discrete elements such as islands or protrusions, a solid layer, a metallic layer, a liquid-filled layer, a gas-filled layer, or a foamed layer.

The material compositions of the present invention and their application in golf balls are further illustrated in the following non-limiting examples. Specifically, twenty-four golf ball subassemblies of the same composition and construction are divided evenly into a control group and an example group. Each subassembly is formed of a polybutadiene-based solid core of about 1.55 inches in diameter encapsulated within an ionomer-based mantle layer of about 0.035 inches in thickness, so that the subassembly has a diameter of about 1.62 inches. Castable covers of about 0.03 inches in thickness are formed onto the subassemblies using injection molding. The golf balls of the control group are Pro V1® golf balls commercially available from Titleist. The respective cover formulations of the control group and the example group, the physical properties of the resulting golf balls, and their performance characteristics are measured and reported in Table I below.

TABLE I

|  | Control | Example |
|---|---|---|
| Cover Formulation | Polyurethane | Polyurethane |
| Polyol | PTMEG 2000 | PTG-L 2000 |
| Isocyanate Content | 6% NCO (MDI) | 7.9% NCO ($H_{12}$MDI) |
| Curing Agent | Ethacure ® 300 | Clearlink ® 1000 |
| Physical Properties |  |  |
| Material Hardness | 45 Shore D | 53 Shore D |
| Hardness (on the ball) | 58 Shore D | 63 Shore D |
| Weight | 1.603 | 1.602 |
| Compression | 89 | 91 |
| Performance Data |  |  |
| COR at 125 ft/s | 0.811 | 0.809 |
| QUV 8-day ΔYI (Δb*) | 82.2 (30.9) | 0.4 (0.2) |

Both the controls and the samples comprised a solid polybutadiene core of about 1.55 inches in diameter, a Surlyn® ionomer-based intermediate layer of about 0.035 inches thick, and a cover of about 0.03 inches thick. The final golf balls had a size of about 1.68 inches in diameter. The 8-day accelerated weathering test (QUV) simulating outdoor exposure to moisture and sunlight entailed cycling the finished golf balls between 4-hour illumination periods under a UV-340a lamp at an irradiance power of 1.00 W/m²/nm and an air temperature of 50° C., and 4-hour dark periods at an air temperature of 40° C. The covers were tested for changes in yellow index ("ΔYI") according to ASTM G53-88 (now replaced with ASTM G154-00), and changes in perceptual yellowness ("Δb*") according to CIELAB. The cover formulation of the controls was unsaturated, comprising a prepolymer of 6% NCO, formed from polytetramethylene glycol (molecular weight of about 2,000) and 4,4'-diphenylmethane diisocyanate (MDI). Consequently both ΔYI and Δb* were large. In comparison, the cover formulation of the samples used a saturated composition of the present invention, comprising a prepolymer of 8% NCO, formed from a copolymer of tetrahydrofuran and 2-methyl-tetrahydrofuran (molecular weight of about 2,000) and 4,4'-dicyclohexylmethane diisocyanate ($H_{12}$MDI). Besides being harder, the sample cover displayed much better light stability (smaller ΔYI and Δb*) than the controls.

The compositions for golf ball portions as disclosed herein may be used in sporting equipment in general. Specifically, the compositions may be applied in various game balls, golf club shafts, golf club head inserts, golf shoe components, and the like.

All patents and patent applications cited in the foregoing text are expressly incorporated herein by reference in their entirety.

The invention described and claimed herein is not to be limited in scope by the specific embodiments herein disclosed, since these embodiments are intended solely as illustrations of several aspects of the invention. Any equivalent embodiments and various modifications apparent to those skilled in the art are intended to be within the scope of this invention. It is further understood that the various features of the present invention can be used singly or in combination thereof. Such modifications and combinations are also intended to fall within the scope of the appended claims.

What is claimed is:

1. A golf ball comprising a core and a cover, wherein the cover comprises a thermoplastic or thermoset composition comprising:
    a reactant A comprising an isocyanate; and
    a reactant B comprising a polyether polyol comprising a repeating branched oxyalkylene monomer unit of the structure:

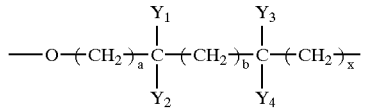

where
    $Y_1$ is a hydrocarbon,
    $Y_2$, $Y_3$, and $Y_4$ are independently hydrogen or hydrocarbons,
    a, b, and x are independent whole numbers of 0 to about 10, and
    at least one of a, b, and x is an integer of 1 to about 10, or
a polymerized polyol formed from a chiral diol of the structure:

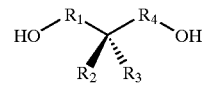

or a chiral cyclic ether of the structure:

where
    $R_1$ and $R_4$ are different linear or branched hydrocarbons of 1 to about 10 carbon atoms, and
    $R_2$ and $R_3$ are different moieties of hydrogen or linear or branched hydrocarbons of 1 to about 10 carbon atoms.

2. The golf ball of claim 1, wherein reactant B is the polymerized polyol, the polymerized polyol being formed from a copolymerization of the chiral diol or the chiral cyclic ether and a second diol or cyclic ether having about 2 carbon atoms to about 20 carbon atoms.

3. The golf ball of claim 2, wherein the chiral diol comprises 2-methyl-1,4-butanediol, and the second diol or cyclic ether comprises 1,4-butanediol or tetrahydrofuran.

4. The golf ball of claim 2, wherein the chiral cyclic ether comprises 2-methyl-tetrahydrofuran, and the second diol or cyclic ether comprises 1,4-butanediol or tetrahydrofuran.

5. The golf ball of claim 1, wherein the reactant B is a substantially non-crystalline block co-polyether polyol having a melting point of less than about 15° C.

6. The golf ball of claim 1, wherein reactant B has a molecular weight of about 500 to about 10,000.

7. The golf ball of claim 1, wherein reactant A is an organic, modified organic, aliphatic, alicyclic, unsaturated, araliphatic, aromatic, substituted, or unsubstituted isocyanate, comprising isocyanate-containing monomers, dimers, trimers, multimeric adducts, oligomers, polymers, prepolymers, low-free-monomer prepolymers, quasi-prepolymers, diisocyanates, polyisocyanates, uretdiones, isocyanurates, or blends thereof.

8. The golf ball of claim 1, wherein the composition further comprises a curing agent comprising saturated or unsaturated monomeric polyahls, oligomeric polyahls, polyether polyahls, polyester polyahls, polycaprolactone polyahls, polycarbonate polyahls, polyhydrocarbon polyahls, polyamide polyahls, polyolefin polyahls, polyahls converted from acid functional oligomers or polymers or ionomers thereof, diols, triols, tetraols, polyols, diamines, triamines, tetramines, polyamines, amine- and hydroxy-containing hybrid compounds, or epoxies.

9. The golf ball of claim 1, wherein the composition is substantially saturated.

10. The golf ball of claim 1, wherein the composition has a material hardness of less than about 70 Shore D.

11. The golf ball of claim 1, wherein the golf ball has a compression of less than about 100.

12. The golf ball of claim 1, wherein the golf ball further comprises an intermediate layer disposed between the core and the cover, the intermediate layer comprising ionomers, elastomers, or acid copolymers or terpolymers having an acid content of about 2% to about 50% and being neutralized by about 0% to about 100%.

13. The golf ball of claim 1, wherein the cover comprises an outer cover layer and an inner cover layer, at least one of the cover layers is formed from a polyurethane or polyurea composition having a Shore D hardness of about 30 to about 70 and a flexural modulus of about 10,000 psi to about 80,000 psi.

14. The golf ball of claim 1, wherein the reactants A and B form a prepolymer having an NCO content of 7% to 15%.

15. The golf ball of claim 1, wherein the branched oxyalkylene monomer unit comprises —O—CH$_2$—CH(CH$_3$)—CH$_2$—CH$_2$—, —O—CH$_2$—CH$_2$—CH(CH$_3$)—CH$_2$—, —O—CH(CH$_3$)—CH$_2$—CH$_2$—CH$_2$—, or —O—CH$_2$—CH$_2$—CH$_2$—CH(CH$_3$)—.

16. The golf ball of claim 15, wherein the polyether polyol further comprises a linear oxyalkylene monomer unit comprising —O—CH$_2$—CH$_2$—CH$_2$—CH$_2$—CH$_2$—, —O—CH$_2$—CH$_2$—CH$_2$—CH$_2$—, —O—CH$_2$—CH$_2$—CH$_2$—, or —O—CH$_2$—CH$_2$—.

17. The golf ball of claim 15, wherein the polyether polyol has a formula of:

$$HO\text{---}[(R_5\text{---}O)_m\text{---}(R_6\text{---}O)_n]_z\text{---}R_6\text{---}OH$$

where
—O—R$_5$— is —O—CH$_2$—CH$_2$—CH$_2$—CH$_2$—;
—O—R$_6$— is —O—CH$_2$—CH(CH$_3$)—CH$_2$—CH$_2$—;
m and n are independent integers of about 5 to about 50; and
z is an integer from 1 to about 50.

18. The golf ball of claim 2, wherein a molar ratio of the chiral diol or the chiral cyclic ether to the second diol or cyclic ether is about 85:15 to about 20:80.

19. The golf ball of claim 1, wherein the polyether polyol or the polymerized polyol has a hydroxyl number of 10 to 150.

20. The golf ball of claim 1, wherein the core has a diameter of about 1.5 inches to about 1.65 inches, a compression of about 30 to about 120, and a coefficient of restitution of about 0.75 or greater.

21. The golf ball of claim 1, wherein the cover comprises an outer cover layer and at least one intermediate layer disposed between the core and the outer cover layer, at least one of the intermediate layer and the outer cover layer comprises the composition and has a thickness of about 0.005 inches to about 0.05 inches.

22. The golf ball of claim 1, wherein the composition further comprises a curative comprising 2,3-dimethyl-2,3-butanediol, 2-methyl-1,3-propanediol, 2-methyl-1,4-butanediol, or 1,4-butanediol.

23. The golf ball of claim 1, wherein the polyether polyol is a hydroxy-terminated poly(tetrahydrofuran-co-methyltetrahydrofuran).

24. A golf ball comprising a core and a cover, the cover comprising a thermoplastic or thermoset composition comprising a polyol and a hindered secondary diamine, wherein the polyol comprises a repeating oxyalkylene unit of:

$$\text{---}O\text{---}(CH_2)_a\text{---}\underset{Y_2}{\overset{Y_1}{C}}\text{---}(CH_2)_b\text{---}\underset{Y_4}{\overset{Y_3}{C}}\text{---}(CH_2)_x\text{---},$$

where
Y$_1$ is a hydrocarbon,
Y$_2$, Y$_3$, and Y$_4$ are independently hydrogen or hydrocarbons,
a, b, and x are independent whole numbers of 0 to about 10, and
at least one of a, b, and x is an integer;
or the polyol is formed from a diol $$HO\diagup\underset{R_2}{\overset{R_1}{C}}\diagdown OH$$

or a cyclic ether $$\underset{R_3\quad R_4}{R_2\diagdown\overset{R_1}{C}\diagup O}$$

where
R$_1$ is a linear or branched hydrocarbon of 1 to about 10 carbon atoms,
R$_2$ is a hydrocarbon of 1 to about 10 carbon atoms, or hydrogen when R$_1$ is a branched hydrocarbon,
R$_3$ is hydrogen or a linear or branched hydrocarbon of 1 to about 10 carbon atoms, and
R$_4$ is a linear or branched hydrocarbon of 1 to about 10 carbon atoms.

25. The golf ball of claim 24, wherein the hindered secondary diamine comprises 4,4'-bis-(sec-butylamino)-dicyclohexylmethane.

26. The golf ball of claim 1, wherein the oxyalkylene unit comprises —O—CH$_2$—CH(CH$_3$)—CH$_2$—CH$_2$—, —O—CH$_2$—CH$_2$—CH(CH$_3$)—CH$_2$—, —O—CH(CH$_3$)—CH$_2$—CH$_2$—CH$_2$—, or —O—CH$_2$—CH$_2$—CH$_2$—CH(CH$_3$)—, and the polyol further comprises —O—CH$_2$—CH$_2$—CH$_2$—CH$_2$—.

27. A golf ball comprising a core, an intermediate layer disposed about the core, and a cover disposed about the intermediate layer, wherein:
the core has a diameter of about 1.5 inches to about 1.65 inches and a compression of about 20 to about 120;
the intermediate layer has a water vapor transmission rate lower than that of the cover; and
the cover comprises a hydroxy-terminated poly(tetrahydrofuran-co-methyltetrahydrofuran), a saturated polyisocyanate, and a hindered secondary diamine.

* * * * *